(12) United States Patent
Arai et al.

(10) Patent No.: US 6,183,033 B1
(45) Date of Patent: Feb. 6, 2001

(54) AUTOMOBILE SEAT

(75) Inventors: Tomiji Arai; Katsunori Nakane, both of Kanagawa-ken (JP)

(73) Assignee: Ikeda Bussan Co., Ltd., Kanagawa-ken (JP)

( * ) Notice: Under 35 U.S.C. 154(b), the term of this patent shall be extended for 0 days.

(21) Appl. No.: 09/277,376

(22) Filed: Mar. 29, 1999

(30) Foreign Application Priority Data

| Mar. 31, 1998 | (JP) | 10-87688 |
| Mar. 31, 1998 | (JP) | 10-87699 |
| Mar. 31, 1998 | (JP) | 10-87700 |

(51) Int. Cl.$^7$ ................ B60N 2/14; B60N 2/20
(52) U.S. Cl. .............. 296/65.09; 296/65.14; 296/69; 297/331; 297/378.12
(58) Field of Search .................. 296/65.01, 65.09, 296/65.13, 65.14, 69, 66; 297/344.1, 313, 331, 334, 335, 336, 378.1, 378.12, 378.13, 354.13, 366, 377

(56) References Cited

U.S. PATENT DOCUMENTS

| 2,916,325 | * | 12/1959 | Estes et al. |  |
| 3,097,881 | * | 7/1963 | Aguilar |  |
| 3,171,682 | * | 3/1965 | Buser et al. |  |
| 5,156,437 | * | 10/1992 | Hayakawa et al. | 297/335 |
| 5,156,438 | * | 10/1992 | Hayakawa et al. | 297/335 |
| 5,158,338 | * | 10/1992 | Hayakawa et al. | 297/335 |
| 5,195,802 | * | 3/1993 | Hayakawa et al. | 297/335 |

FOREIGN PATENT DOCUMENTS

| 0 689 954 A2 | 1/1996 | (EP) . |
| 0 780 261 A2 | 6/1997 | (EP) . |
| 0 911 210 A2 | 4/1999 | (EP) . |
| 683443 | 11/1952 | (GB) . |
| 7-27239 | 6/1995 | (JP) . |

* cited by examiner

Primary Examiner—D. Glenn Dayoan
Assistant Examiner—Patricia Engle
(74) Attorney, Agent, or Firm—Nath & Associates; Gary M. Nath; Harold L. Novick

(57) ABSTRACT

An automobile seat is composed of a seat cushion, seat back, and supporting element. The seat cushion supports the hip portion of a vehicle occupant at its normal position. The seat cushion is disposed so that the seat cushion may be freely movable while being forwardly rotated about a front end supporting fulcrum from the normal position to an inverted position. The seat cushion has a reverse surface which is made substantially horizontal at its inverted position. The seat back supports the back of the vehicle occupant at its normal position. The seat back is disposed so that the seat back may be freely movable while being forwardly fallen down from the normal position to a fall-down position. The seat back has a rear surface which is made substantially horizontal at its fall-down position. The reverse surface of the seat cushion at the inverted position and the rear surface of the seat back at the fall-down position are located at substantially the same height level. By the movements of the seat cushion and seat back to their respective inverted position and fall-down position, the seat has its attitude changed from its ordinary state to its flat state. The supporting element fixes the seat cushion and seat back to an automobile body. The supporting element supports the seat cushion and seat back so that the seat cushion and seat back may be freely backwardly slidable from a first position for the ordinary state to a second position for the flat state.

13 Claims, 14 Drawing Sheets

AUTOMOBILE SEAT

BACKGROUND OF THE INVENTION

The present invention relates to an automobile seat whose attitude is freely changeable from an ordinary state to a flat state.

Japanese Utility Model Application Laid-Open Publication No. H7-27239 discloses a seat that is freely changeable from an ordinary state to a flat state. A seat cushion is forwardly rotated about a front end supporting fulcrum and moved to a substantially horizontal inverted position. A seat back is forwardly inclined about a lower end supporting fulcrum and moved to a substantially horizontal fall-down position. In the flat state, a reverse surface of the seat cushion at the inverted position and a rear surface of the seat back at the fall-down position form the flat surfaces that are substantially at the same height level.

SUMMARY OF THE INVENTION

However, in the above-described conventional technique, the seat cushion is forwardly inverted about the front end supporting fulcrum. Therefore, the seat in the flat state forwardly protrudes by the entire length of the seat cushion. For this reason, it is difficult to apply the seat to an automobile having no sufficient space in front of the seat.

An object of the present invention is to provide an automobile seat which even when no sufficient space exists in front of the seat can be changed to a flat state.

To attain the above object, an automobile seat according to the present invention is composed of a seat cushion, seat back, and supporting element. The seat cushion supports the hip portion of a vehicle occupant at its normal position. The seat cushion is disposed so that the seat cushion may be freely movable while being forwardly rotated about a front end supporting fulcrum from the normal position to an inverted position. The seat cushion has a reverse surface which is made substantially horizontal at its inverted position. The seat back supports the back of the vehicle occupant at its normal position. The seat back is disposed so that the seat back may be freely movable while being forwardly fallen down from the normal position to a fall-down position. The seat back has a rear surface which is made substantially horizontal at its fall-down position. The reverse surface of the seat cushion at the inverted position and the rear surface of the seat back at the fall-down position are located at substantially the same height level. By the movements of the seat cushion and seat back to their respective inverted position and fall-down position, the seat has its attitude changed from its ordinary state to its flat state. The supporting element fixes the seat cushion and seat back to an automobile body. The supporting element supports the seat cushion and seat back so that the seat cushion and seat back may be freely backwardly slidable from a first position for the ordinary state to a second position for the flat state.

When changing the seat from its ordinary state to its flat state for the purpose of a break or quiet sleep or of widely using the interior of an automobile compartment, the seat cushion and seat back are slid from the first position to the second backward position and are then moved to the inverted position and fall-down position to thereby dispose the reverse surface of the seat cushion and the rear surface of the seat back in substantially the same plane. Therefore, the amount of forward protrusion of the seat cushion at the inverted position is decreased. Accordingly, it is possible to obtain a seat that can be applied to an automobile having no sufficient space in front of the seat.

The supporting element may be composed of a fixed rail fixed to the floor of an automobile body and a movable rail for supporting the seat cushion and seat back, and the movable rail may be freely slidably engaged with the fixed rail.

In the above-described construction, by moving the movable rail, the seat cushion and seat back are moved from the first positions to the second positions.

The seat may further comprise a seat frame for supporting the seat cushion and seat back, the seat frame may comprise the front end supporting fulcrum and rear end supporting fulcrum, and the supporting element may support the seat frame so that the seat frame may be freely backwardly slidable from a first position for the ordinary state to a second position for the flat state.

In the above-described construction, by moving the seat frame, the seat cushion and seat back are moved from the first position to the second position.

Further, the supporting element may be composed of a fixed rail fixed to the floor of an automobile body and rollers provided on the seat frame, and the rollers may be freely slidably engaged with the fixed rail.

Also, the rollers may protrude laterally from both sides of the seat frame.

The seat may further comprise a first lock mechanism for unlockably locking the seat cushion at the normal position thereof, a second lock mechanism for unlockably locking the seat back at the normal position thereof, a first unlocking mechanism for unlocking the locked state of the first lock mechanism with the movement of the seat cushion toward the second position, and a second unlocking mechanism for unlocking the locked state of the second lock mechanism with the movement of the seat back toward the second position.

According to the above-described construction, when retreating the seat frame up to the second position, the locked states of the first and second lock mechanisms are automatically released. Accordingly, the operation for releasing the locked states of the first and second lock mechanisms becomes unnecessary, with the result that the operating efficiency becomes high.

The seat frame may have a slide lock freely engageable with the fixed rail and an operating lever for moving the slide lock, and the slide lock having been engaged with the fixed rail may the seat frame to the fixed rail.

In the above-described construction, the seat frame is fixed to the first and second position by the slide lock. Further, by moving the operating lever, the engagement of the slide lock with the fixed rail is released, with the result that the seat frame becomes freely slidable.

In a case where the supporting element is composed of a fixed rail fixed to the floor of an automobile body and a movable rail for supporting the seat cushion and seat back and when the movable rail is freely slidably engaged with the fixed rail, the seat cushion may include, when the seat cushion is located at its normal position, an intermediate supporting fulcrum located backwardly from the front end supporting fulcrum, and the intermediate supporting fulcrum is freely rotatably connected through a link to a fixed supporting fulcrum located backwardly from the intermediate supporting fulcrum and fixed to the floor of the automobile body.

Also, the fixed supporting fulcrum may be provided on the fixed rail.

In the above-described construction, when changing the seat from the ordinary state to the flat state, the seat cushion is moved to the inverted position and the seat back is moved to the fall-down position. When the seat cushion is moved while being rotated about the front end supporting fulcrum, the front end supporting fulcrum itself is backwardly moved using the fixed supporting fulcrum as a basis. The amount of forward protrusion of the seat cushion at the inverted position is decreased by the length which is twice as large as that corresponding to the spacing between the front end supporting fulcrum and fixed supporting fulcrum as compared with that when the seat cushion is in the ordinary state. Accordingly, the seat has a wider range of applicability to an automobile having no sufficient space in front thereof. Also, the position in the back-and-forth direction of the seat is fixed by the intermediate supporting fulcrum of the seat cushion being connected through a link to the fixed supporting fulcrum. For this reason, a lock mechanism for regulating the position in the back-and-forth direction of the seat becomes unnecessary. This is advantageous for a decrease in the weight of an automobile body as well as for a decrease in the cost. In addition, a mechanism for stopping a further rotation of the seat cushion from the inverted position thereof and thereby maintaining the seat cushion substantially at the horizontal level also becomes unnecessary.

Also, the movable rail is automatically slid from the first position to the second position that is rear from this first position through the movement of the seat cushion to the inverted position. Accordingly, the seat has an excellent operating efficiency.

The seat back may include an intermediate supporting fulcrum, and the intermediate supporting fulcrum may be connected to the fixed rail through a link that is freely foldable.

In the above-described construction, when the seat back is moved to the fall-down position, the foldable link is accommodated compactly.

DESCRIPTION OF THE PREFERRED EMBODIMENTS

Figure 1:
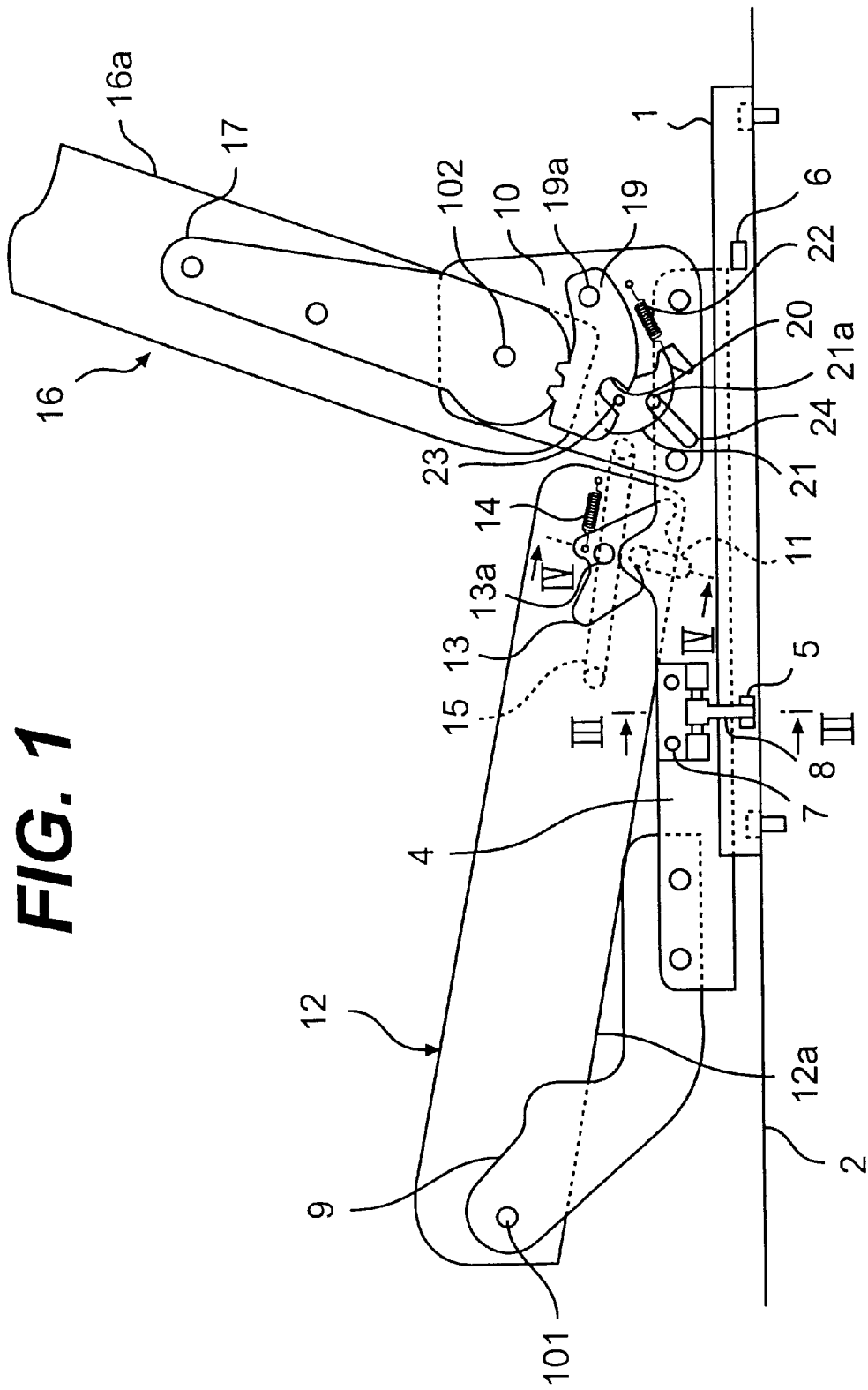
FIG. 1 is a side view showing an ordinary state of a seat according to a first embodiment.
Figure 2:
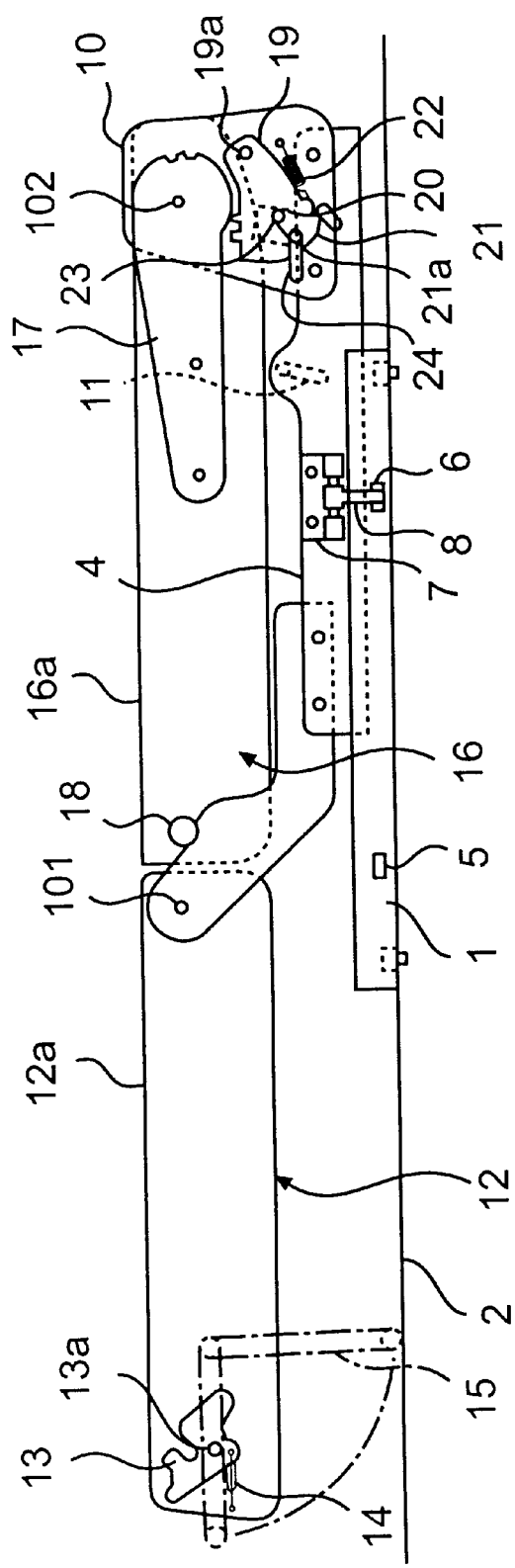
FIG. 2 is a side view showing a flat state of the seat in FIG. 1.
Figure 3:
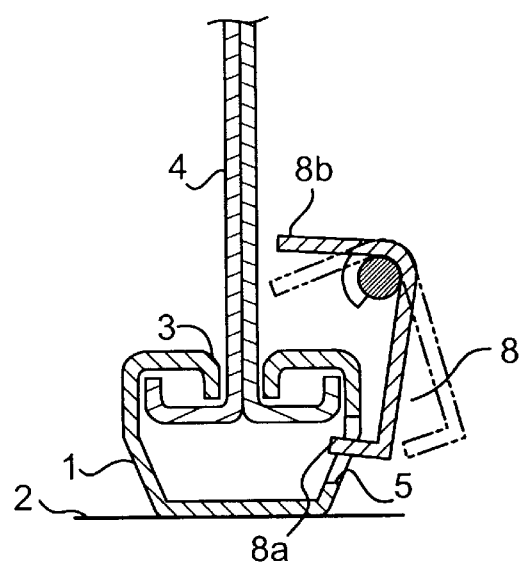
FIG. 3 is a sectional view taken along line III—III of FIG. 1.
Figure 4:
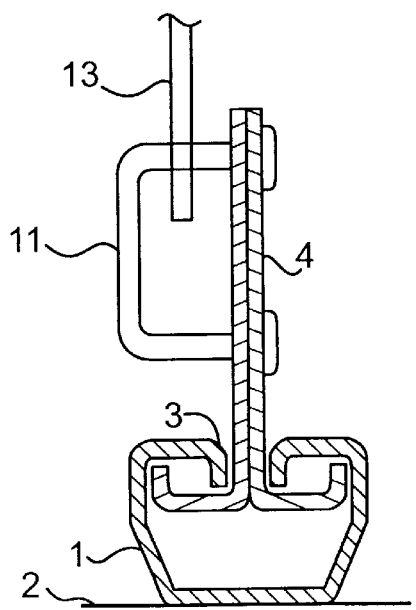
FIG. 4 is a sectional view taken along line IV—IV of FIG. 1.

Preferred embodiments of the present invention will be described with reference to the drawings below.

FIGS. 1 to 4 show a first embodiment of the present invention. The first embodiment relates to a seat in the third row (third seat) of a wagon vehicle and has a movable structure of a slide rail system.

A pair of fixed rails 1 are fixed on a left side portion and a right side portion of a vehicle body floor 2 in the drawings, respectively. Each fixed rail 1 has an opening 3 formed along its longitudinal direction on an upper face thereof. An inverse T-shaped movable rail 4 is fitted in each fixed rail 1 slidably in a longitudinal direction of a vehicle through rollers (not shown).

The fixed rail 1 is formed with a front latch hole 5 provided at a first position for sitting and a rear latch hole 6 provided at a second position for changing the seat to a flat state, respectively. An upper portion of the movable rail 4 which projects upward from the opening 3 of the fixed rail 1 is provided with a latch piece 8 rotatably supported by a pin of a latch plate 7. The latch piece 8 is biased to rotate toward the fixed rail 1 side by a spring (not shown). When a tip end 8a of the latch piece 8 is engaged in the latch hole 5 or 6, the movable rail 4 at the first or second position is prevented from moving in a sliding manner. When the other end 8b of the latch piece 8 is pressed, the latch piece 8 rotates to be released from the latch hole 5 or 6.

A front end portion of the movable rail 4 is fixed with a front plate 9. A rear end portion of the movable rail 4 is fixed with a device plate 10. An intermediate portion of the movable rail 4 is fixed with a U-shaped striker 11 (shown in FIG. 4).

A front end portion of a seat cushion 12 is ratatably connected to and supported at a front end supporting fulcrum 101 of the front plate 9. A side face of the rear end portion of the seat cushion 12 is provided with a hook 13 engageable with the striker 11 and rotatable about a supporting fulcrum 13a. The hook 13 is biased by a spring 14 in a direction in which it is engaged with the striker 11. When the hook is rotated in a disengaging direction against a biasing force of the spring 14, the engaging state between the hook 13 and the striker 11 is cancelled or disengaged. A rear end portion of the seat cushion 12 is provided rotatably with an approximately U-shaped large leg member 15 covering the rear end portion.

A device arm 17 fixed to a side face of the seat back 16 is mounted to the device plate 10 rotatably about a lower end supporting fulcrum 102. The seat back16 can be rotated forward and rearward about the lower end supporting fulcrum 102. Aside face of an upper end portion of the seat back 16 is provided with a pin 18 (shown in FIG. 2). A stopper 19 engaging a lower end portion of the device arm 17 to prevent the device arm 17 from rotating is provided rotatably about a supporting fulcrum 19a below the device arm 17. The stopper 19 is biased in a direction in which it is engaged with the device arm 17 by a spring (not shown). A lower edge of the stopper 19 is formed with a notch 20.

A rotary plate 21 is provided rotatably about a supporting fulcrum 21a below the stopper 19. A lower end portion of the rotary plate 21 is provided with a spring 22 biasing the rotary plate 21 in a counterclockwise direction in FIG. 1. An upper end of the rotary plate 21 is formed with a pin 23 corresponding to the notch 20 of the stopper 19. An operating lever 24 integrated with the rotary plate 21 is provided at supporting the fulcrum 21a of the rotary plate 21. When the operating lever 24 is lifted upwardly, the rotary plate 21 rotates in a clockwise direction against the spring 22, the pin 23 enters into the notch 20 and the pin pushes the stopper 19 upwardly, so that the engagement between the stopper 19 and the device arm 17 is cancelled.

Next, procedures for changing the seat from an ordinary state to a flat state will be explained.

First, the latch piece 8 of the movable rail 4 is released from the latch hole 5 of the fixed rail 1 and the movable rail 4 together with the seat cushion 12 and the seat back 16 is slid rearward. After the movable rail 4 is moved rearward from the first position to the second position, the latch piece 8 is engaged with the corresponding latch hole 6, so that the movable rail 4 is fixed at the second position.

Secondly, the hook 13 is rotated to cancel the engagement between the hook 13 and the striker 11, the seat cushion 12 as a whole is rotated forward about the front end fulcrum 101 while it is being lifted up, and the seat cushion 12 is moved up to a inverted position where a back face 12a of the seat cushion 12 faces upward. A substantially horizontal state of the seat cushion 12 is maintained by the leg member 15 which has been put in a standing-up state.

Thirdly, the operating lever 13 is lifted upward. Thereby, the rotary plate 21 Is rotated and the pin 23 enters into the notch 20 to press the stopper 19 downward, so that the engagement between the stopper 19 and the device arm 17 is cancelled. Then, the seat back 16 is rotated forward about the lower end supporting fulcrum 102 to be moved to a substantially horizontally fall-down position. The pin 18 at the upper end portion of the seat back 16 is engaged with the upper edge of the front plate 9 so that the seat back 16 is maintained in the substantially horizontal state, A back face 16a of the seat back 16 maintained in the substantially horizontal state is put in the same height as that of the back face 12a of the seat cushion 12, so that a flat continuous face is formed by the rear face 16a and the back face 12a.

In this embodiment, as the seat cushion 12 and the seat back 16 are rotated forward, respectively, after they are moved to the second position rearward of the first position, a relative forward-projecting amount of the seat cushion 12 is reduced, so that the structure of the embodiment is applicable to an automobile where a sufficient space is not provided ahead of a seat.

Figure 5:
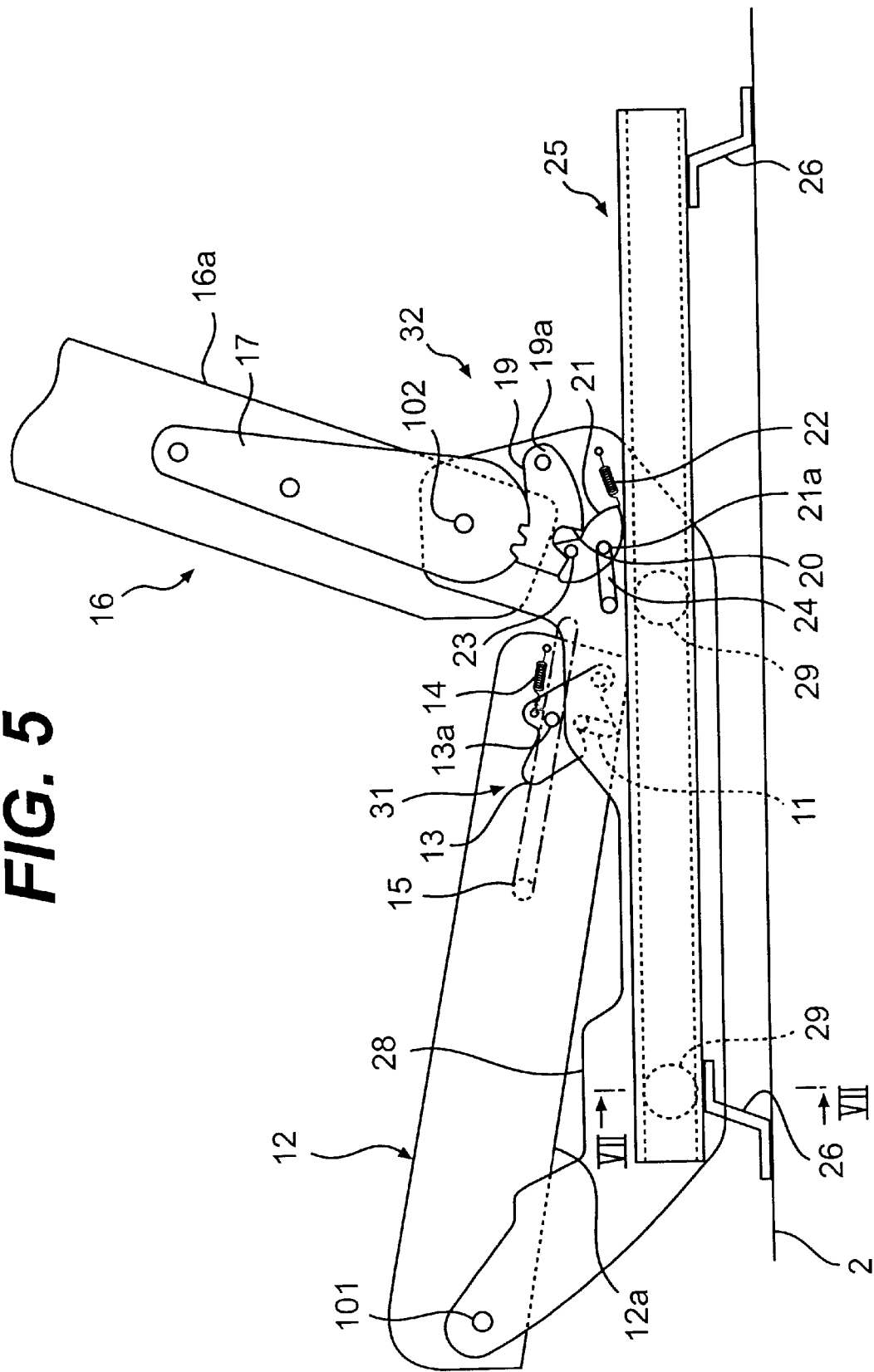
FIG. 5 is a side view showing an ordinary state of a seat according to a second embodiment.
Figure 6:
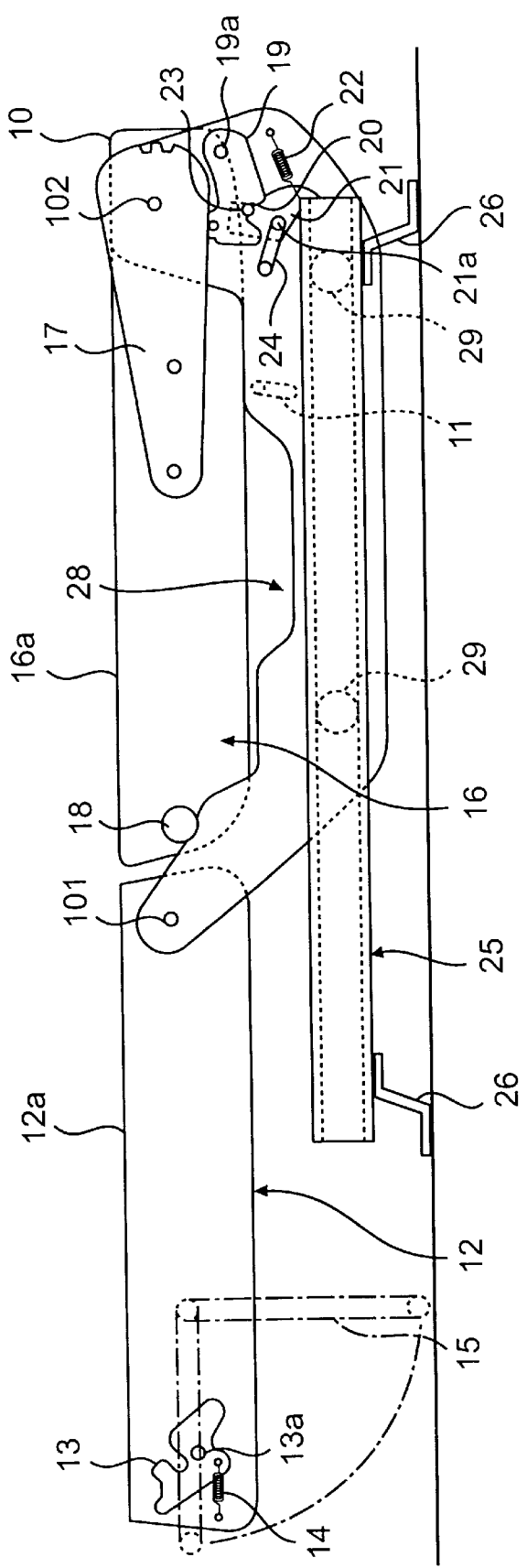
FIG. 6 is a side view showing a flat state of the seat in FIG. 5.
Figure 7:
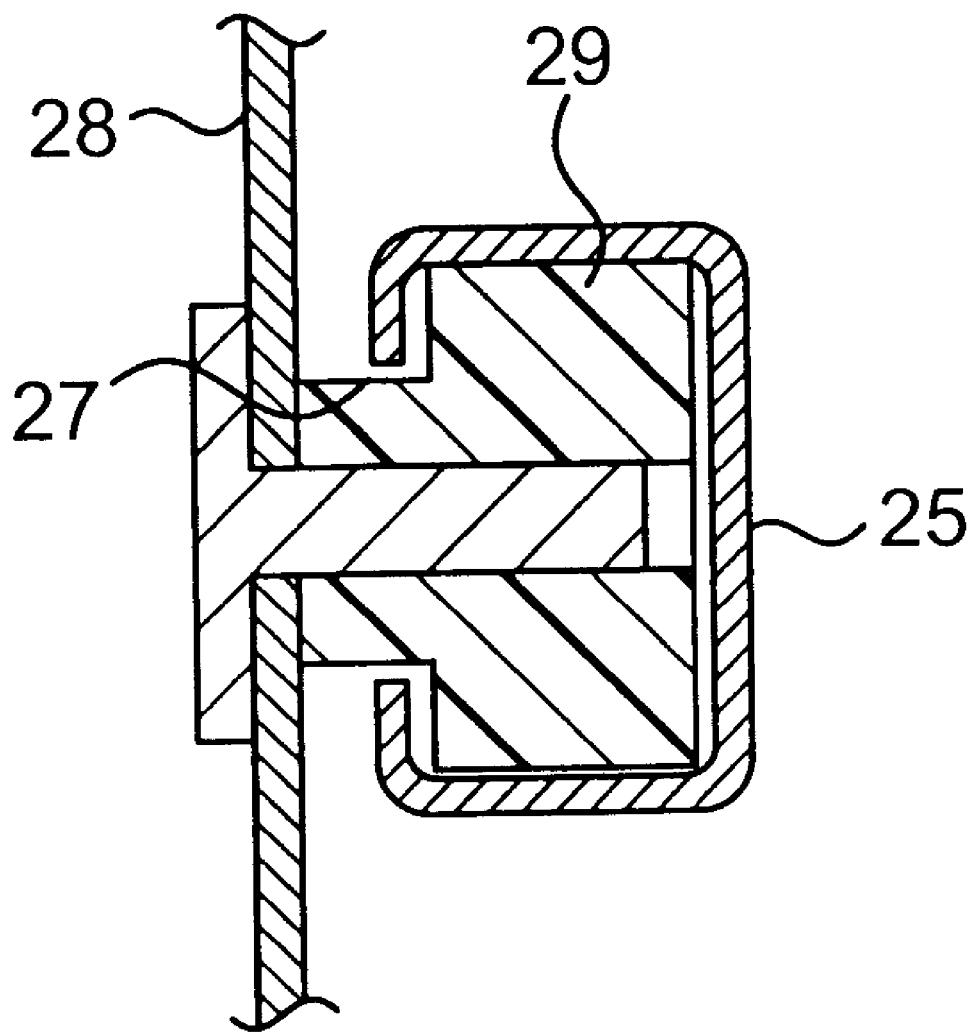
FIG. 7 is a sectional view taken along line IIV—IIV of FIG. 5.
Figure 8:
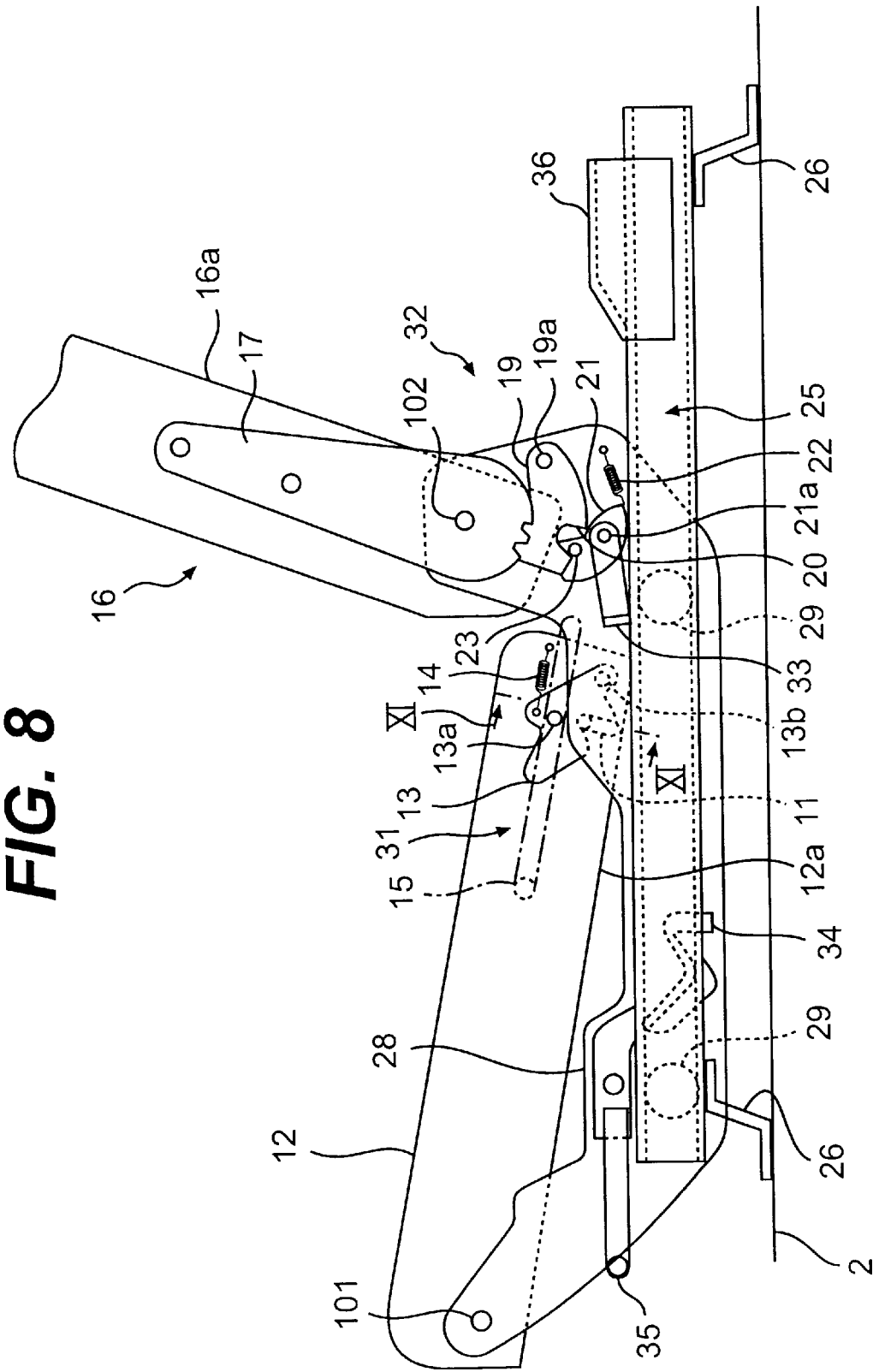
FIG. 8 is a side view showing an ordinary state of a seat according to a third embodiment.
Figure 9:
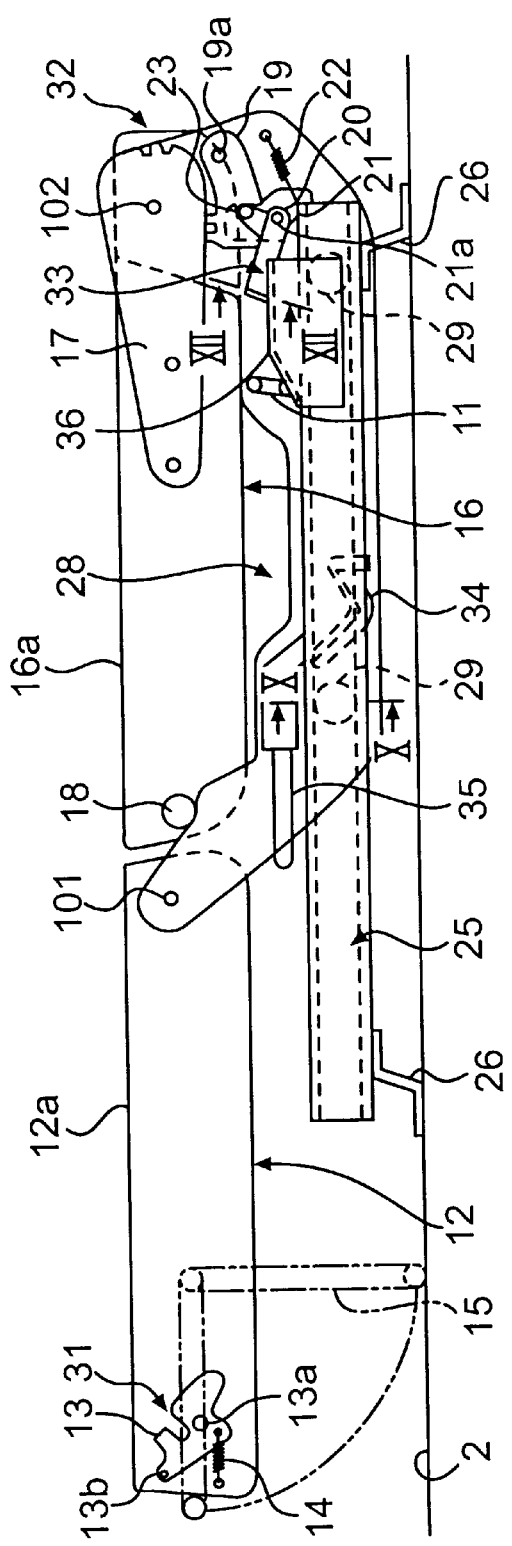
FIG. 9 is a side view showing a flat state of the seat in FIG. 8.
Figure 10:
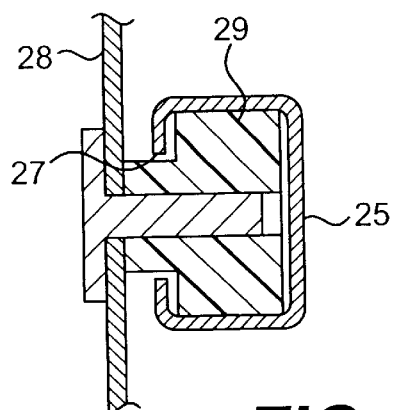
FIG. 10 is a sectional view taken along line X—X of FIG. 9.
Figure 11:
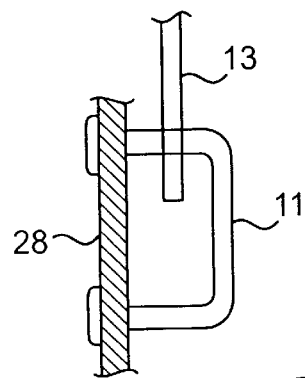
FIG. 11 is a sectional view taken along line XI—XI of FIG. 8.
Figure 12:
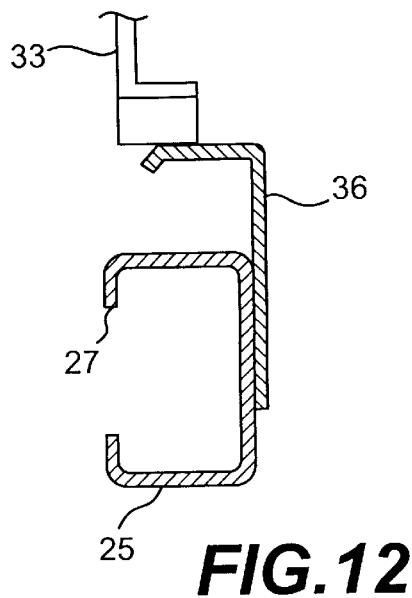
FIG. 12 is a sectional view taken along line XII—XII of FIG. 9.
Figure 13:
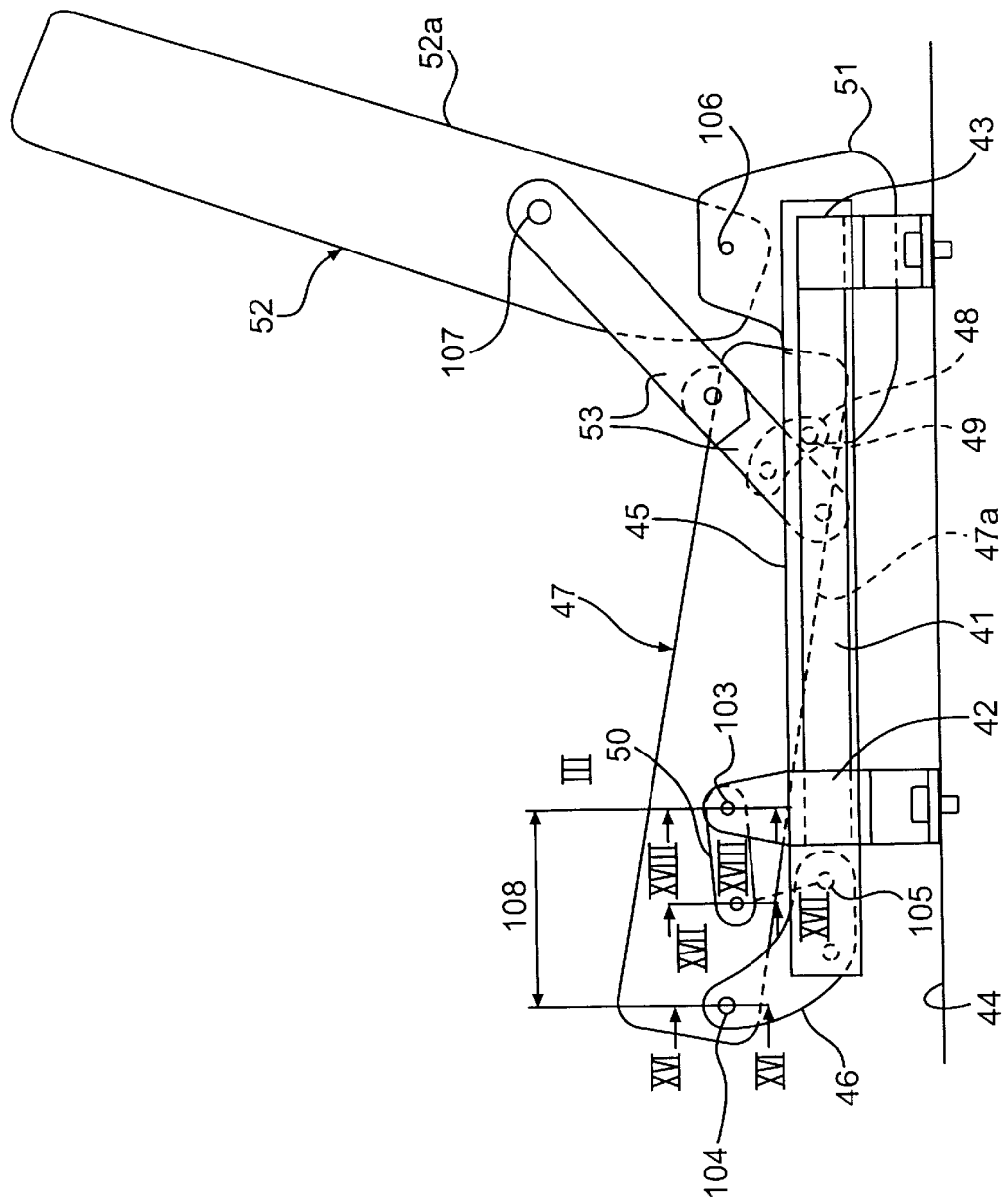
FIG. 13 is a side view showing an ordinary state of a seat according to a fourth embodiment.
Figure 14:
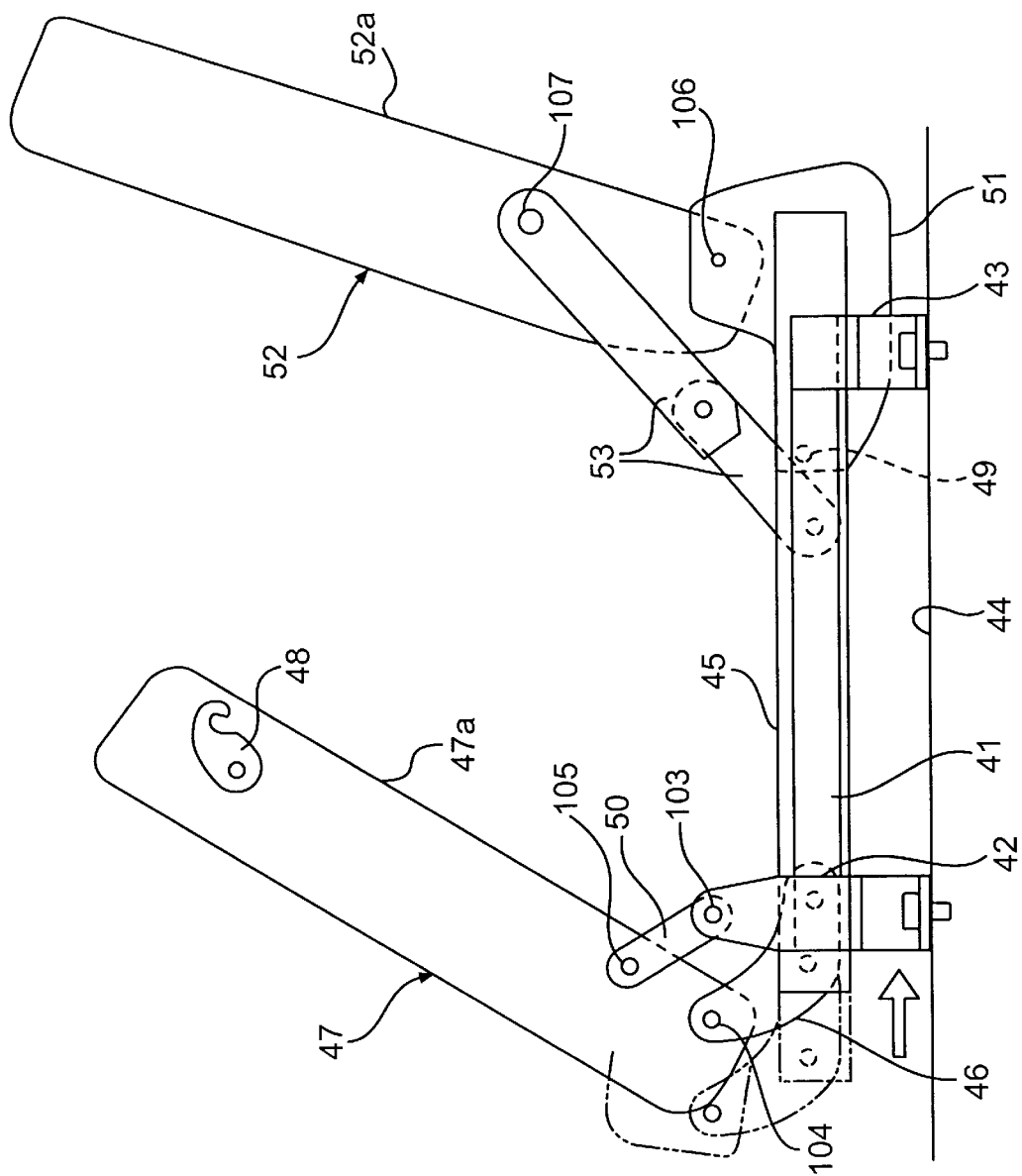
FIG. 14 is a side view showing an middle way of movement of a seat cushion of FIG. 13.
Figure 15:
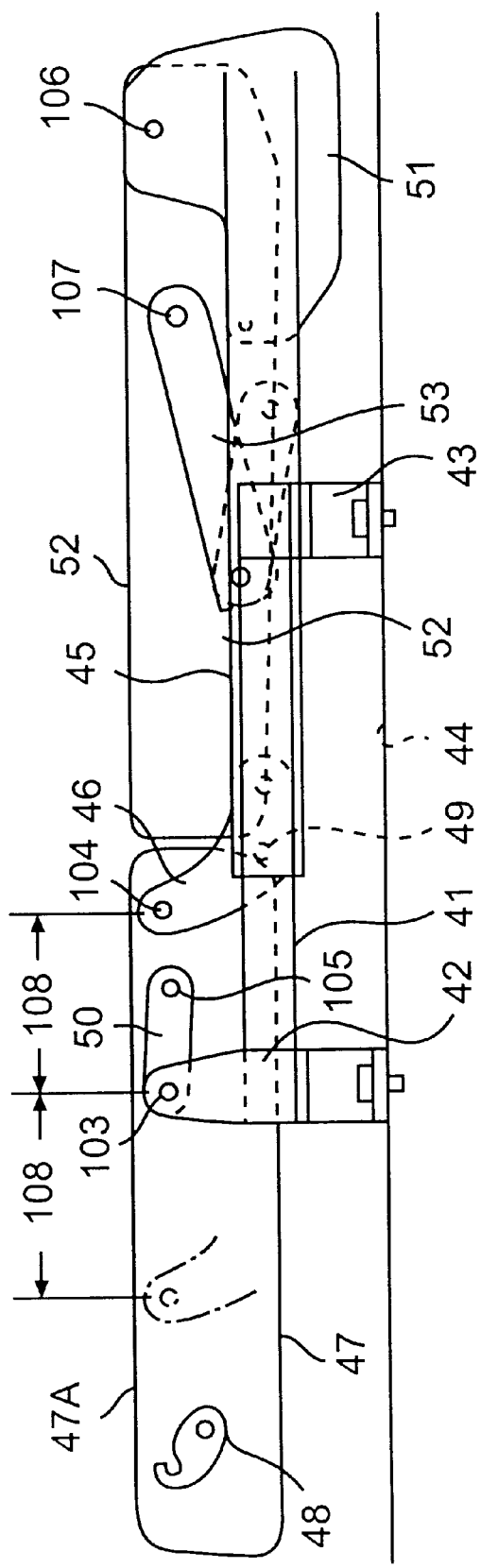
FIG. 15 is a side view showing a flat state of the seat in FIG. 13.
Figure 16:
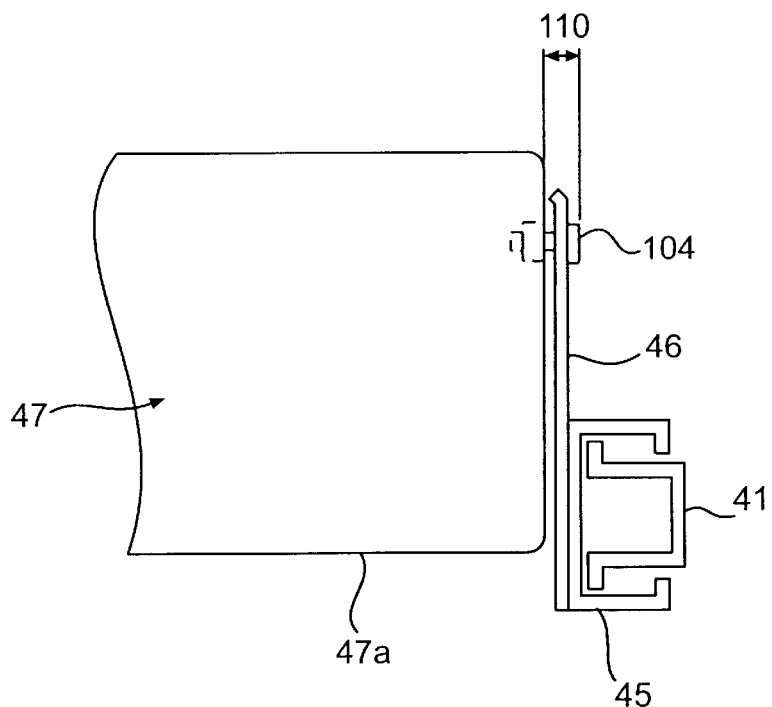
FIG. 16 is a sectional view taken along line XVI—XVI of FIG. 13.
Figure 17:
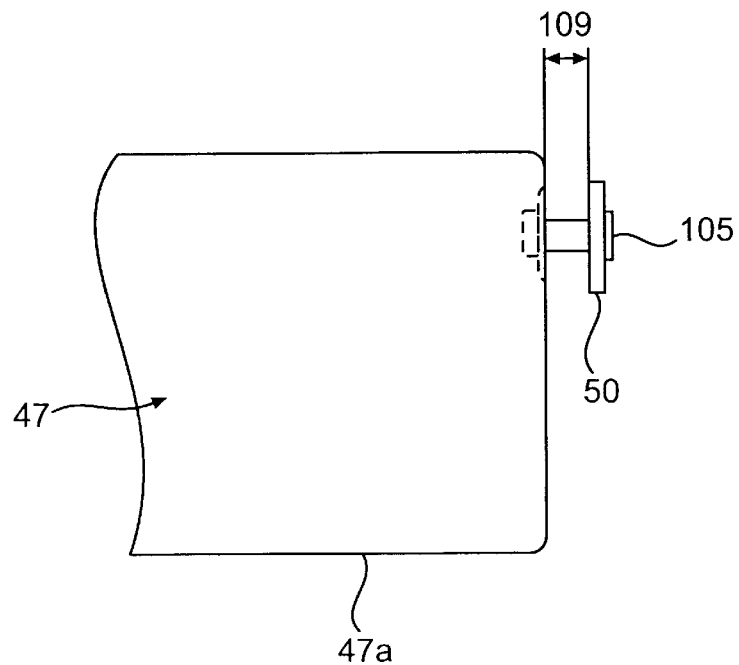
FIG. 17 is a sectional view taken along line XVII—XVII of FIG. 13.
Figure 18:
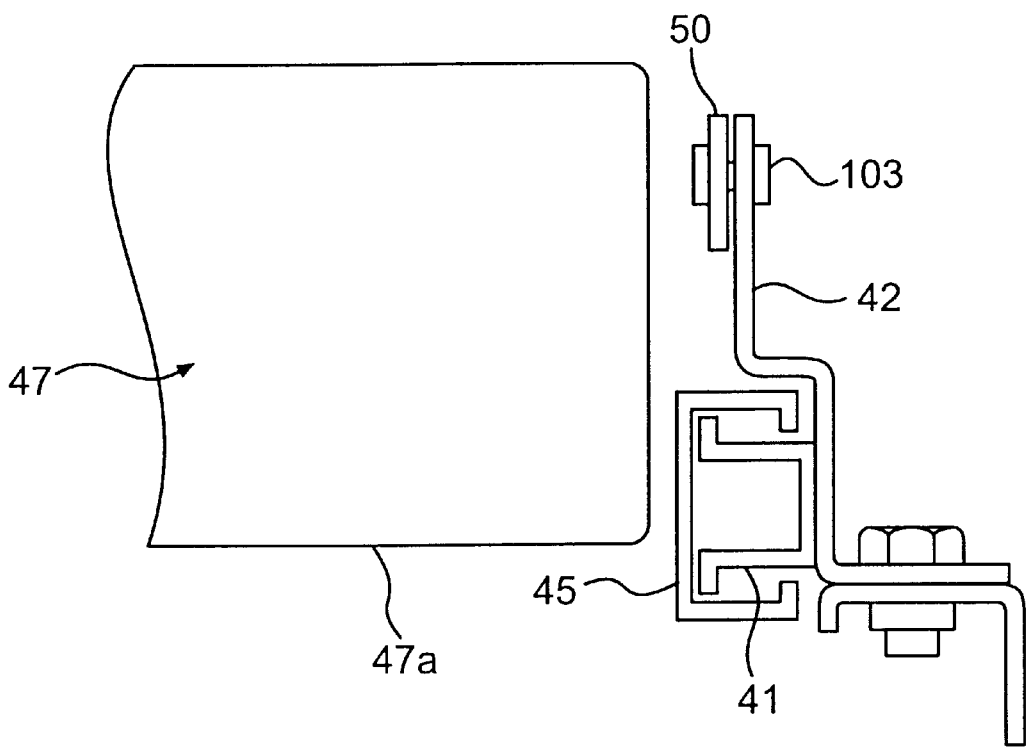
FIG. 18 is a sectional view taken along line XVIII—XVIII of FIG. 13.

FIGS. 5 to 7 show a second embodiment of the present invention. The second embodiment has a movable structure of a roller type.

A pair of fixed rails 25 are fixed on a left side portion and a right side portion of the vehicle body floor 2 in the drawings. Each fixed rail 25 has an approximately C-shaped sectional configuration and is formed on its upper face with an opening 27 along the longitudinal direction thereof.

The seat cushion 12 and the seat back 16 are supported by a seat frame 28. Rollers 29 projecting in a vehicle transverse outer side direction are provided at a front end and a rear end of the seat frame 28 (shown in FIG. 7). Each roller 29 is fitted in the fixed rail 25 movably in a sliding manner along the longitudinal direction of the fixed rail 25. The seat cushion 12 and the seatback 16 together with the seat frame 28 are provided movably in a sliding manner between the front first position for sitting and the rear second position for changing the seat to the flat state. It is to be noted that a locking mechanism (not shown) is provided between the seat frame 28 and the fixed rail 25. The seat frame 28 is fixed at the first position or the second position by the locking mechanism.

Next, a structure for supporting the seat cushion 12 and the seat back 16 to the seat frame 28 will be explained.

A front end portion of the seat frame 28 is provided with a front end supporting fulcrum 101, a rear end portion thereof is provided with a lower end supporting fulcrum 102, and a middle portion thereof is fixed with a U-shaped striker 11.

A front end portion of the seat cushion 12 is rotatably supported at the front end supporting fulcrum 101 of the seat frame 28. A rear end portion of the seat cushion 12 is engaged with the striker 11 by a locking mechanism 31. The locking mechanism 31 includes the hook 13 disposed on a side face of a rear end portion of the seat cushion 12. The hook 13 is provided rotatably about a supporting fulcrum 13a and is engaged with the striker 11. The hook 13 is biased in an engaging direction by a spring 14. When the hook 13 is rotated in a disengaging direction, the engagement between the hook 13 and the striker 11 is cancelled.

A lower end supporting fulcrum 102 of the seat frame 28 is mounted rotatably on a lower end portion of the seat back 16 through a locking mechanism 32. The locking mechanism 32 includes the stopper 19 and the rotary plate 21. The device arm 17 fixed to a side face of the seat back 16 is mounted rotatably to the lower end supporting fulcrum 102, and the seat back 16 is rotatable forward and rearward about the lower end supporting fulcrum 102. The pin 18 is provided on a side face of an upper end portion of the seat back 16 (shown in FIG. 6). A stopper 19 engaged with a lower end portion of the device arm 17 to prevent the device arm 17 from rotating is provided rotatably about the supporting fulcrum 19a. The stopper 19 is biased in an engaging direction by a spring (not shown), and is formed at its lower edge with a notch 20.

The rotary plate 21 rotating about the supporting fulcrum 21a is provided below the stopper 19. A spring 22 biasing the rotary plate 21 in a counterclockwise direction in the FIG. 5 is provided at a lower end portion of the rotary plate 21. A pin 23 corresponding to the notch 20 of the stopper 19 is formed at an upper end portion of the rotary plate 21. U-205 When the rotary plate 21 is rotated against the spring 22 in a clockwise direction in FIG. 5, the pin 23 enters into the notch 20 to press the stopper 19 downward. Thereby, the engagement between the stopper 19 and the device arm 17 is cancelled.

In a case where the seat is changed from an ordinary state to a flat state, the seat cushion 12 and the seat back 16 are slid from the first position to the rear second position and then are individually rotated forward, like the first embodiment. Accordingly, a relative forward-projecting amount of the seat cushion 12 is reduced, and the structure of the embodiment is applicable to an automobile where a sufficient space can not be provided ahead of a seat.

FIGS. 8 to 12 show a third embodiment of the present invention. In the third embodiment, the same structures as those in the second embodiment are attached with the same reference numerals as those in the second embodiment, and explanation thereof is omitted.

A guide plate 36 having an upper edge higher than an upper face portion of the fixed rail 25 is provided at a rear end portion of the fixed rail 25. The guide plate 36 is provided at its front end with a slanting face contiguous to the upper face portion of the fixed rail 25.

A sliding lock 34 entering into the fixed rail 25 from the opening 27 to engage a locking hole (not shown) positioned at a lower face of the fixed rail 25 is provided at a front end of the seat frame 28. When the sliding lock 34 is engaged with the lower face of the fixed rail 25, the seat frame 28 is locked to the fixed rail 25 and, when the former is disengaged from the latter, it is made slidable in a longitudinal direction of the fixed rail 25. Locking holes (not shown) are provided at the first and second positions, and the seat frame 28 is fixed at the first position or the second position by the sliding lock 34. When an operating lever 35 extending from an upper portion of the sliding lock 34 is lifted up, the sliding lock 34 rotates to be disengaged from the engagement with the fixed rail 25.

A pin 13b which can ride on the guide plate 36 is provided at a lower end portion of the hook 13. An approximately U-shaped large leg member 15 is rotatably provided at a rear end portion of the seat cushion 12.

An operating lever 33 integrated with the rotary plate 21 is provided at the supporting fulcrum 21a of the rotary plate 21. When the operating lever 33 is rotated so as to ride on the guide plate 36, the rotary plate 21 rotates against the spring 22 in a clockwise direction in FIG. 8 and the pin 23 enters into the notch 20 to press up the stopper 19. Thereby, the engagement between the stopper 19 and the device arm 17 is cancelled.

Next, procedures for changing the seat from the ordinary state to the flat state will be explained.

First, the operating lever 35 is lifted up to rotate the sliding lock 34, and the engagement between the seat frame 28 and the fixed rail 25 is cancelled. Then, the seat frame 28 is slid rearward together with the seat cushion 12 and the seat back 16. When the seat frame 28 is moved rearward to the second position, the sliding lock 34 is again engaged with the fixed rail 25.

Secondly, when the seat frame 28 reaches to the rear second position, the pin 13b of the hook 13 of the locking mechanism 31 rides on the guide plate 36 and the hook 13 rotates. Thereby, the engagement between the hook 13 and the striker 11 Is automatically cancelled. Then, the seat cushion 12 as a whole is moved up to the inverted position in a rotating manner, Simultaneously, when seat frame 28 reaches to the rear second position, the operating lever 33 of the locking mechanism 32 rides on the guide plate 36 and the rotary plate 21 rotates. Thereby, the pin 23 enters into the notch 20 to press down the stopper 19, so that the engagement between the rotary plate 21 and the device arm 17 is automatically cancelled. Then, the seat back 16 is fall-down to the fall-down position. The pin 18 at the upper end portion is engaged with the upper edge of the seat frame 28 so that the seat back 16 is maintained in the substantially horizontal state.

Thus, in the case that the seat is changed from the ordinary state to the flat state, the seat cushion 12 and the seat back 16 are rotated forward, respectively, while they are being slid from the first position to the rear second position in the same manner as the first and second embodiments. As a result, a relative forward-projecting amount of the seat cushion 12 is reduced, so that the structure in the embodiment is applicable to an automobile where a sufficient space is not provided ahead of a seat.

Furthermore, as each of the looking mechanisms 31 and 32 is unlocked by merely moving the seat frame 28 rearward up to the second position, it becomes unnecessary to perform an unlocking operation on the locking mechanism 31, which results in improvement in operation performance.

FIGS. 13 to 18 show a fourth embodiment of the present invention.

Front and rear end portions of a fixed rail 41 are fixed on a vehicle body floor 44 by brackets 42 and 43, each comprising a pair of upper and lower parts. The front bracket 42 projects above the fixed rail 41 and an upper end portion thereof is provided with a fixed supporting fulcrum (hinge pin) 103.

A movable rail 45 has a C-shaped configuration opened outwardly and is engaged with the fixed rail 41 movably in a sliding manner along the longitudinal direction of the fixed rail 41. A front end of the movable rail 45 is provided with a supporting plate 46. A front end portion of a seat cushion 47 put in an ordinary state is connected to an upper end portion of the supporting plate 46 rotatably through a front end supporting fulcrum (hinge pin) 104. A hook 48 is provided at a rear end portion of the seat cushion 47. The hook 48 is engaged with a pin 49 of the movable rail 45, so that an ordinary state of the seat cushion 47 is maintained. In the ordinary state, the fixed supporting fulcrum 103 is positioned by a length 108 rearward from the front end supporting fulcrum 104 of the seat cushion.

The seat cushion 47 includes an intermediate supporting fulcrum (hinge pin) 105 positioned rearward from the front end supporting fulcrum 104 and forward from the fixed supporting fulcrum 103. A link 50 connects the intermediate supporting fulcrum 105 and the fixed fulcrum 103 to each other. A clearance 109 (shown in FIG. 17) between a side face of the seat cushion 47 and the link 50 in the intermediate supporting fulcrum 105 is set to be smaller than a projecting amount 110(shown in FIG. 16) of the front end supporting fulcrum 104.

A rear side supporting plate 51 is provided at a rear end portion of the movable rail 45. A lower end supporting fulcrum 106 of the seat back 52 Is supported on the supporting plate 51. A two-foldable link 53 extending obliquely connects an intermediate supporting fulcrum 107 of the seat back 52 and the movable rail 45 to each other.

Next, procedures for changing the seat from an ordinary state to a flat state.

First, the hook 48 of the seat cushion 47 is released from the pin 49, and the seat cushion 47 is rotated as a whole forward about the front end supporting fulcrum 104. At this time, as the intermediate supporting fulcrum 105 is connected to the fixed supporting fulcrum 103 via the link 50, the front end supporting fulcrum 104 is moved rearward while being rotated. As a result, both the seat cushion 47 and the seat back 52 are moved rearward. When the front end supporting fulcrum 104 is moved rearward, the front end supporting fulcrum 104 passes through inside of the link 50. At this time, since the clearance 109 between the link 50 and the seat cushion 47 is larger than the projecting amount 110 of the front end supporting fulcrum 104, the front end supporting fulcrum 104 securely passes through the link 50 without interfering with the link 50. The fixed supporting fulcrum 103, the front end supporting fulcrum 104 and the intermediate supporting fulcrum 105 must be set to be a positional relationship where they do not form an equilateral triangle, namely, a relationship where the seat cushion 47 is smoothly rotated.

When the seat cushion 47 is put to a substantially horizontal inverted position, the forward-projecting amount of the seat cushion 47 is moved rearward by an amount corresponding to two times a distance 108 between the front end supporting fulcrum 104 and the fixed supporting fulcrum 103. The seat cushion 47 put in the inverted position is maintained in the substantially horizontal state by a two-point support of the front end supporting fulcrum 104 and the intermediate supporting fulcrum 105.

Secondly, the seat back 52 is fell forward and is put in a substantially horizontal fall-down position. At this time, the foldable link 53 is folded at its intermediate portion, and it is accommodated compactly in a space corresponding to a side face of the seat back 52. A rear face 52a of the seat back 52 at the fall-down position is positioned in the same height as that of the back face 47a of the seat cushion 47, and the rear face 52a and the back face 47a forms a contiguous flat face.

As in the fourth embodiment the seat cushion 47 and the seat back 52 are positioned at the inverted position and the fall-down position, respectively, in the state where they are put in the second position rearward of the first position in the same manner as the first embodiment, a relative forward-projecting amount of the seat cushion 47 is reduced, and the structure of the fourth embodiment is applicable to an automobile where a sufficient space is not provided ahead of a seat.

Also, since the intermediate supporting fulcrum 105 of the seat cushion 47 is coupled to the fixed supporting fulcrum 103 via the link 50, the position of the seat along the longitudinal direction of the vehicle body floor 44 is locked. As a result, a locking mechanism for restraining the position of the seat along the longitudinal direction becomes unnecessary. Furthermore, as the seat cushion 47 and the seat back 52 are automatically moved rearward in a sliding manner by only rotating the seat cushion 47 forward, the fourth embodiment has an excellent operation performance.

It is to be noted that the fixed supporting fulcrum 103 is set to the bracket 42 of the fixed rail 41 in the above explanation, but it may be set to another bracket mounted to the vehicle body floor 44 independently. Also, in the structure of the embodiment, a boss is provided in a projecting manner at a side portion of the seat cushion 47 and an arm for receiving the boss is provided in a projecting manner at the front bracket 42, so that a supporting force for supporting the seat cushion 47 at the inverted position is supplemented so that a range of durable weight can be enlarged. Furthermore, similarly, an arm member contacting with the vehicle body floor 44 is provided at the hook 48 or the like, so that a supporting force for supporting the seat cushion 47 can be supplemented by the arm member. Also, these two techniques can simultaneously be applied to the structure of the embodiment.

What is claimed is:

1. An automobile seat whose attitude is freely changeable from an ordinary state to a flat state, comprising:

a seat cushion being rotatable forwardly about a front end support fulcrum from a normal position for supporting a hip portion of a vehicle occupant to an inverted position, the seat cushion having a reverse surface which is made substantially horizontal at the inverted position thereof;

a seat back being rotatable forwardly about a lower supporting fulcrum from a normal position for supporting a back of the vehicle occupant to a fall-down position, the seat back having a rear surface which is made substantially horizontal at the fall-down position, the reverse surface of the seat cushion in the inverted position and the rear surface of the seat back in the fall-down position being located at substantially the same height level, the seat changed from the ordinary state to the flat state by movements of the seat cushion and seat back to the inverted position and the fall-down position;

a supporting element for fixing the seat cushion and seat back to an automobile body, the supporting element supporting the seat cushion and seat back so that the seat cushion and seat back may be freely backwardly slidable from first positions for their ordinary states to second positions for their flat states, respectively;

a first lock mechanism for locking the seat cushion in the normal position thereof;

a second lock mechanism for locking the seat back in the normal position thereof;

a first unlocking mechanism unlocking the first lock mechanism with a movement of the seat cushion toward the second position; and a second unlocking mechanism for unlocking the second lock mechanism with a movement of the seat back toward the second position.

2. An automobile seat according to claim 1, wherein:

the supporting element is composed of a fixed rail fixed to a floor of an automobile body and a movable rail that supports the seat cushion and seat back, and the movable rail is provided so that the movable rail may be freely slidably engaged with the fixed rail and freely movable from a first position for the ordinary state to a second state for the flat state.

3. An automobile seat according to claim 1, further comprising a seat frame for supporting the seat cushion and seat back, wherein:

the seat frame includes the front end supporting fulcrum and lower end supporting fulcrum, and the supporting element supports the seat frame so that the seat frame may be freely slidable from a first position for the ordinary state to a second position for the flat state.

4. An automobile seat according to claim 3, wherein:

the supporting element is composed of a fixed rail fixed to a floor of an automobile body and a roller provided on the seat frame, and the roller is freely slidably engaged with the fixed rail.

5. An automobile seat according to claim 4, wherein:

the rollers protrude laterally from both sides of the seat frame.

6. An automobile seat according to claim 4, wherein:

the seat frame has a slide lock freely engageable with the fixed rail and an operating lever for moving the slide lock; and the slide lock having been engaged with the fixed rail fixes the seat frame to the fixed rail.

7. An automobile seat whose attitude is freely changeable from an ordinary state to a flat state, comprising:

a seat cushion being rotatable forwardly about a front end support fulcrum from a normal position for supporting a hip portion of a vehicle occupant to an inverted position, the seat cushion having a reverse surface which is made substantially horizontal in the inverted position thereof;

a seat back being rotatable forwardly about a lower supporting fulcrum from a normal position for supporting a back of the vehicle occupant to a fall-down position, the seat back having a rear surface which is made substantially horizontal in the fall-down position, the reverse surface of the seat cushion in the inverted position and the rear surface of the seat back in the fall-down position being located at substantially the same height level, the seat changed from the ordinary state to the flat state by movements of the seat cushion and seat back to the inverted position and fall-down position;

a seat frame for supporting the seat cushion and seat back, the seat frame including the front end supporting fulcrum and lower end supporting fulcrum;

a supporting element for fixing the seat cushion and seat back to an automobile body, the supporting element supporting the seat frame so that the seat frame may be freely backwardly slidable from a first position for the ordinary state to a second position for the flat state, the supporting element having a fixed rail fixed to a floor of an automobile body and a roller provided on the seat frame, the roller freely slidably engaged with the fixed rail;

a first lock mechanism provided between the seat cushion and seat frame, the first lock mechanism being freely settable to a locked state where the seat cushion is maintained in the normal position and to an unlocked state where the rotational movement of the seat cushion is permitted, and being biased to the locked state;

a second lock mechanism provided between the seat back and seat frame, the second lock mechanism being freely settable to a locked state where the seat back is maintained in the normal position and to an unlocked state where the fall-down movement of the seat back is permitted, and being biased to the locked state;

a first unlocking mechanism changing the first lock mechanism from the locked state to the unlocked state with a movement of the seat frame toward the second position; and a second unlocking mechanism changing the second lock mechanism from the locked state to the unlocked state with a movement of the seat cushion toward the second position.

8. An automobile seat whose attitude is freely changeable from an ordinary state to a flat state, comprising:

a seat cushion being rotatable forwardly about a front end support fulcrum from a normal position for supporting a hip portion of a vehicle occupant to an inverted position, the seat cushion having a reverse surface which is made substantially horizontal in the inverted position thereof;

a seat back being rotatable forwardly about a lower supporting fulcrum from a normal position for supporting a back of the vehicle occupant to a fall-down position, the seat back having a rear surface which is made substantially horizontal in the fall-down position, the reverse surface of the seat cushion in the inverted position and the rear surface of the seat back in the fall-down position being located at substantially the same height level, the seat changed from the ordinary state to the flat state by movements of the seat cushion and seat back to the inverted position and fall-down position;

a seat frame for supporting the seat cushion and seat back, the seat frame including the front end supporting fulcrum and lower end supporting fulcrum;

a supporting element for fixing the seat cushion and seat back to an automobile body, the supporting element supporting the seat frame so that the seat frame may be freely backwardly slidable from a first position for the ordinary state to a second position for the flat state, the supporting element having a fixed rail fixed to a floor of an automobile body and a roller provided on the seat frame, the roller freely slidably engaged with the fixed rail;

a first lock mechanism provided between the seat cushion and seat frame, the first lock mechanism being freely settable to a locked state where the seat cushion is maintained in the normal position and to an unlocked state where the rotational movement of the seat cushion is permitted, and being biased to the locked state;

a second lock mechanism provided between the seat back and seat frame, the second lock mechanism being freely settable to a locked state where the seat back is maintained in the normal position and to an unlocked state where the fall-down movement of the seat back is permitted, and being biased to the locked state;

a first unlocking mechanism changing the first lock mechanism from the locked state to the unlocked state with a movement of the seat frame toward the second position; and a second unlocking mechanism changing the second lock mechanism from the locked state to the unlocked state with a movement of the seat cushion toward the second position, wherein:

each of the first and second unlocking mechanisms includes a guide plate provided on the fixed rail; and the movements of the first and second lock mechanisms relative to the guide plate cause the occurrence of the unlocked states.

9. An automobile seat whose attitude is freely changeable from an ordinary state to a flat state, comprising:

a seat cushion being rotatable forwardly about a front end support fulcrum from a normal position for supporting a hip portion of a vehicle occupant to an inverted position, the seat cushion having a reverse surface which is made substantially horizontal at the inverted position thereof;

a seat back being rotatable forwardly about a lower supporting fulcrum from a normal position for supporting a back of the vehicle occupant to a fall-down position, the seat back having a rear surface which is made substantially horizontal at the fall-down position, the reverse surface of the seat cushion in the inverted position and the rear surface of the seat back in the fall-down position being located at substantially the same height level, the seat changed from the ordinary state to the flat state by movements of the seat cushion and seat back to the inverted position and the fall-down position;

a supporting element for fixing the seat cushion and seat back to an automobile body, the supporting element supporting the seat cushion and seat back so that the seat cushion and seat back may be freely backwardly slidable from first positions for their ordinary states to second positions for their flat states, respectively; wherein the supporting element is composed of a fixed rail fixed to a floor of an automobile body and a movable rail that supports the seat cushion and seat back, the movable rail is provided so that the movable rail may be freely slidably engaged with the fixed rail and freely movable from a first position for the ordinary state to a second state for the flat state, the seat cushion includes, when the seat cushion is located at the normal position, an intermediate supporting fulcrum located backwardly from the front end supporting fulcrum; and the intermediate supporting fulcrum is freely rotatably connected through a link to a fixed supporting fulcrum located backwardly from the intermediate supporting fulcrum and fixed to the floor of the automobile body.

10. An automobile seat according to claim 9, wherein:

the fixed supporting fulcrum is provided on the fixed rail.

11. An automobile seat according to claim 9, wherein:

the front end supporting fulcrum is disposed in the vicinity of a front end of the movable rail.

12. An automobile seat whose attitude is freely changeable from an ordinary state to a flat state, comprising:

a seat cushion being rotatable forwardly about a front end support fulcrum from a normal position for supporting a hip portion of a vehicle occupant to an inverted position, the seat cushion having a reverse surface which is made substantially horizontal at the inverted position thereof;

a seat back being rotatable forwardly about a lower supporting fulcrum from a normal position for supporting a back of the vehicle occupant to a fall-down position, the seat back having a rear surface which is made substantially horizontal at the fall-down position, the reverse surface of the seat cushion in the inverted position and the rear surface of the seat back in the fall-down position being located at substantially the same height level, the seat changed from the ordinary state to the flat state by movements of the seat cushion and seat back to the inverted position and the fall-down position;

a supporting element for fixing the seat cushion and seat back to an automobile body, the supporting element supporting the seat cushion and seat back so that the seat cushion and seat back may be freely backwardly slidable from first positions for their ordinary states to second positions for their flat states, respectively; wherein the supporting element is composed of a fixed rail fixed to a floor of an automobile body and a movable rail that supports the seat cushion and seat back, the movable rail is provided so that the movable rail may be freely slidably engaged with the fixed rail and freely movable from a first position for the ordinary state to a second state for the flat state, the seat back includes an intermediate supporting fulcrum; and the intermediate supporting fulcrum is connected to the fixed rail through a link that is freely foldable.

13. An automobile seat according to claim 12, wherein:

the lower end supporting fulcrum is disposed in the vicinity of a back end of the movable rail.

* * * * *